US010740882B2

(12) United States Patent
Kim

(10) Patent No.: US 10,740,882 B2
(45) Date of Patent: Aug. 11, 2020

(54) IMAGE CORRECTION APPARATUS AND METHOD

(71) Applicant: Hanwha Techwin Co., Ltd., Seongnam-si (KR)

(72) Inventor: Kwan Hoo Kim, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 128 days.

(21) Appl. No.: 15/447,846

(22) Filed: Mar. 2, 2017

(65) Prior Publication Data

US 2018/0144449 A1    May 24, 2018

(30) Foreign Application Priority Data

Nov. 24, 2016    (KR) .......................... 10-2016-0157433

(51) Int. Cl.
*G06K 9/36* (2006.01)
*G06T 5/00* (2006.01)
(Continued)

(52) U.S. Cl.
CPC ........... *G06T 5/006* (2013.01); *H04N 5/3572* (2013.01); *H04N 5/23238* (2013.01)

(58) Field of Classification Search
None
See application file for complete search history.

(56) References Cited

U.S. PATENT DOCUMENTS

| 7,671,864 B2* | 3/2010 | Roman ............... G06F 12/0875 |
| | | 345/536 |
| 2010/0328329 A1 | 12/2010 | Mallett |

(Continued)

FOREIGN PATENT DOCUMENTS

| KR | 10-1288378 | 7/2013 |
| KR | 10-1386767 | 4/2014 |
| KR | 10-1540300 | 8/2015 |

OTHER PUBLICATIONS

Clemons et al. ("A Patch Memory System for Image Processing and Computer Vision", Nov. 6, 2016). (Year: 2016).*

*Primary Examiner* — Randolph I Chu
(74) *Attorney, Agent, or Firm* — H.C. Park & Associates, PLC

(57) ABSTRACT

An image correction apparatus includes a second memory configured to store at least a part of an input image; a first memory configured to selectively read a first image block from the second memory and store the selectively read first image block in the first memory; a controller configured to control the first image block to be selectively read from the second memory and to be stored in the first memory based on a predetermined output image generation rule which is determined based on a type of an input image stored in the second memory, wherein the controller is further configured to determine whether the first image block corresponding to a second image block is stored in the first memory based on the predetermined output image generation rule, and when the first image block is not stored in the first memory, read the first image block from the second memory and store the first image block in the first memory, and generate an output image based on the first image block stored in the first memory. An image correction method also is disclosed.

16 Claims, 11 Drawing Sheets

(51) Int. Cl.
*H04N 5/357* (2011.01)
*H04N 5/232* (2006.01)

(56) References Cited

U.S. PATENT DOCUMENTS

| | | | |
|---|---|---|---|
| 2011/0110606 A1* | 5/2011 | Johnson, III | G06T 3/608 |
| | | | 382/296 |
| 2015/0262344 A1* | 9/2015 | Stec | G06T 5/006 |
| | | | 382/275 |

* cited by examiner

IMAGE CORRECTION APPARATUS AND METHOD

CROSS-REFERENCE TO RELATED APPLICATION

This application claims priority from and the benefit of Korean Patent Application No. 10-2016-0157433, filed on Nov. 24, 2016, which is hereby incorporated by reference for all purposes as if fully set forth herein.

BACKGROUND

Field

The invention relates generally to an image correction apparatus and method, and, more particularly, to an image correction apparatus and method capable of increasing processing speed while using a memory having a relatively small size.

Discussion of the Background

When an image is captured by a camera, a peripheral portion of the image or the entire image is often distorted due to the limits of the optical characteristics of a camera lens. Also, dewarping has to be performed in order to see an accurate image obtained by using a fisheye lens.

Various technologies have been developed in order to correct a distorted image. However, these various technologies have drawbacks in that many expensive memories have to be used and a processing speed is low.

SUMMARY

Methods and apparatus constructed according to the principles of the invention provide an image correction technique using a memory having a relatively small size and an increased processing speed.

Methods and apparatus constructed according to the principles of the invention may also provide an image correction apparatus and method including a memory structure suitable for various types of images such as fisheye images, keystone images, and rotated images.

Additional aspects will be set forth in part in the description which follows and, in part, will be apparent from the description, or may be learned by practice of the inventive concepts.

According to one aspect of the invention, an image correction method for generating an output image by reading from a first memory a first image block corresponding to a second image block that is at least a part of an output image includes the steps of: determining whether the first image block corresponding to the second image block is stored in the first memory based on a predetermined output image generation rule, which is determined based on a type of an input image stored in the second memory; when the first image block is not stored in the first memory, reading the first image block from a second memory and storing the first image block in the first memory; and generating the output image based on the first image block stored in the first memory.

The input image may be a fisheye image, a size of the first memory in a first direction may correspond to at least one of a location and a size of a dewarping region in the fisheye image, a size of the first memory in a second direction different from the first direction may be equal to or greater than at least two block sizes, the block size may be a size of the first image block in the second direction, and the step of determining whether the first image block corresponding to the second image block is stored in the first memory based on a predetermined output image generation may include using a predetermined output image generation rule for reading the input image stored in the second memory along a curved line determined based on the dewarping region.

When the dewarping region corresponds to a first mode, a size of the first memory in the first direction may correspond to a size of the input image in at least one of a horizontal direction and a vertical direction.

When the dewarping region corresponds to a second mode, a size of the first memory in the first direction may correspond to a sum of a size of the input image in a horizontal direction and a size of the input image in a vertical direction.

When the dewarping region corresponds to a third mode, a size of the first memory in the first direction may correspond to a circumferential length of the input image.

The input image may be a distorted image, a size of the first memory in a first direction may correspond to a size of the input image in a horizontal direction, and a size of the first memory in a second direction different from the first direction may be equal to or greater than at least two block sizes, the block size may be a size of the first image block in the second direction, and the step of determining whether the first image block corresponding to the second image block is stored in the first memory based on a predetermined output image generation may include using a the predetermined output image generation rule for reading the input image stored in the second memory along a curved line determined based on a distortion ratio of the input image.

The input image may be any one of an image to be keystone-distorted and an image to be rotated, a size of the first memory in a first direction may correspond to at least one of a tilt angle of the input image and a rotation angle of the input image, and a size of the first memory in a second direction different from the first direction may be equal to or greater than at least two block sizes, the block size may be a size of the first image block in the second direction, and the step of determining whether the first image block corresponding to the second image block is stored in the first memory based on a predetermined output image generation may include using a predetermined output image generation rule for reading the input image stored in the second memory in a direction corresponding to at least one of the tilt angle and the rotation angle of the input image.

The step of reading from a first memory may include reading image data of each of one or more first image blocks and information about storage locations of the one or more first image blocks in the second memory in a fourth direction.

The step of the storing the first image block in the first memory may include: determining a storage location of the first image block, which is read from the second memory, in a third direction of the second memory; and storing the read first image block at a storage location of the first memory corresponding to the storage location in the third direction of the second memory.

The step of determining whether the first image block is stored may include: determining a storage location of the first image block, which corresponds to the second image block, in the third direction of the second memory and a storage location of the first image block in a fourth direction of the second memory, based on the predetermined output image generation rule; and determining whether the first image block is stored in the first memory based on the determined storage location in the third direction and the determined storage location in the fourth direction.

According to another aspect of the invention, an image correction apparatus includes: a second memory configured to store at least a part of an input image; a first memory configured to selectively read a first image block from the second memory and store the selectively read first image block in the first memory; and a controller configured to control the first image block to be selectively read from the second memory and to be stored in the first memory based on a predetermined output image generation rule which is determined based on a type of an input image stored in the second memory.

The controller may be further configured to determine whether the first image block corresponding to a second image block is stored in the first memory based on the predetermined output image generation rule, and when the first image block is not stored in the first memory, read the first image block from the second memory and store the first image block in the first memory, and generate an output image based on the first image block stored in the first memory.

The input image may be a fisheye image, a size of the first memory in a first direction may correspond to at least one of a location and a size of a dewarping region in the fisheye image, and a size of the first memory in a second direction different from the first direction may be equal to or greater than at least two block sizes, the block size may be a size of the first image block in the second direction, and the predetermined output image generation rule may include a rule for reading the input image stored in the second memory along a curved line determined based on the dewarping region.

The size of the first memory in the first direction may correspond to a size of the input image in at least one direction from among a horizontal direction and a vertical direction.

The size of the first memory in the first direction may correspond to a sum of a size of the input image in a horizontal direction and a size of the input image in a vertical direction.

The size of the first memory in the first direction may correspond to a circumferential length of the input image.

The input image may be a distorted image, the size of the first memory in a first direction may correspond to a size of the input image in a horizontal direction, and the size of the first memory in a second direction different from the first direction may be equal to or greater than at least two block sizes, the block size being a size of the first image block in the second direction, and the predetermined output image generation rule may include a rule for reading the input image stored in the second memory along a curved line determined based on a distortion ratio of the input image.

The input image may be any one of an image to be keystone-distorted and an image to be rotated, a size of the first memory in a first direction may correspond to at least one of a tilt angle of the input image and a rotation angle of the input image, and the size of the first memory in a second direction different from the first direction may be equal to or greater than at least two block sizes, the block size may be a size of the first image block in the second direction, and the predetermined output image generation rule may include a rule for reading the input image stored in the second memory in a direction corresponding to at least one of the tilt angle and the rotation angle of the input image.

The first memory may include image data of each of one or more first image blocks and information about storage locations of the one or more first image blocks in a fourth direction of the second memory.

The controller may be further configured to determine a storage location of the first image block, which is read from the second memory, in a third direction of the second memory, and store the read first image block at a storage location of the first memory corresponding to the storage location in the third direction of the second memory.

The controller may be further configured to determine a storage location of the first image block, which corresponds to the second image block, in the third direction of the second memory and a storage location of the first image block in a fourth direction of the second memory, based on the predetermined output image generation rule, and determine whether the first image block is stored in the first memory based on the determined storage location in the third direction and the determined storage location in the fourth direction.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE ILLUSTRATED EMBODIMENTS

Figure 1:
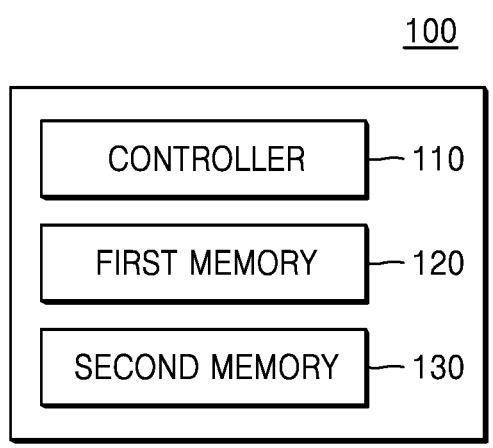
FIG. 1 is a schematic block diagram of a first embodiment of an image correction apparatus constructed according to the principles of the invention.

As the inventive concepts allows for various changes and numerous embodiments, embodiments will be illustrated in the drawings and described in detail in the written description. However, this is not intended to limit the inventive concepts to particular modes of practice, and it is to be appreciated that all changes, equivalents, and substitutes that do not depart from the spirit and technical scope of the inventive concepts are encompassed in the inventive concepts. In the description of the inventive concepts, certain detailed explanations of the related art are omitted when it is deemed that they may unnecessarily obscure the essence of the inventive concepts.

While such terms as "first", "second", etc., may be used to describe various components, such components must not be limited to the above terms. The above terms are used only to distinguish one component from another.

The terms used in the present specification are merely used to describe embodiments, and are not intended to limit the inventive concepts. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The inventive concepts may be described in terms of functional block components and various processing steps. Such functional blocks may be realized by any number of hardware and/or software components configured to perform the specified functions. For example, the inventive concepts may employ various integrated circuit (IC) components, e.g., memory elements, processing elements, logic elements, look-up tables, and the like, which may carry out a variety of functions under the control of one or more microprocessors or other control devices. Similarly, where the elements of the inventive concepts are implemented using software programming or software elements, the inventive concepts may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the inventive concepts could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

As used herein, the term "and/or" includes any and all combinations of one or more of the associated listed items. Expressions such as "at least one of," when preceding a list of elements, modify the entire list of elements and do not modify the individual elements of the list.

FIG. 1 is a schematic block diagram of a first embodiment of an image correction apparatus 100 constructed according to the principles of the invention.

Referring to FIG. 1, the image correction apparatus 100 may include a controller 110, a first memory 120, and a second memory 130.

The first memory 120 may temporarily store at least a part of an input image that is read by the controller 110 from the second memory 130. The at least part of the input image temporarily stored in the first memory 120 may be used to generate an output image. For example, the first memory 120 may store image block(s) relating to the at least part of the input image which is distorted. Further, the image block(s) stored in the first memory 120 may be read from the second memory 130 if the second memory 130 already stored the corrected image data corresponding to the distorted image. Here, the corrected image data in the second memory 130 may be related to a previous corrected output image data or a first stored reference image data.

The first memory 120 may refer to a memory having an access speed that is higher than that of the second memory 130. In this case, the access speed may refer to a read and/or write speed of each memory.

The first memory 120 may be, for example, a static random-access memory (SRAM) that is used as a cache memory. However, embodiments are not limited thereto.

The first memory 120 has a size and/or a structure that varies according to a type of the input image, which will be explained below in detail.

The second memory 130 may temporarily store at least a part of the input image under the control of the controller 110.

The second memory 130 may refer to a memory having an access speed that is lower than that of the first memory 120. In this case, the access speed may refer to a read and/or write speed of each memory.

The second memory 130 may be, for example, a dynamic random-access memory (DRAM) that stores a frame of an image. However, embodiments are not limited thereto, and any of various other memories may be used as the second memory 130.

The controller 110 may read data from the second memory 130 according to a type of the input image, as is known in the art and will be explained below in detail. The term 'read' used herein refers to a process of reading data, in particular, image data, from a corresponding memory.

The controller 110 may generate an output image by performing various operations on the input image. For example, the controller 110 may generate an output image whose distortion is corrected by performing distortion correction on the input image as is known in the art. In this case, the controller 110 may include any type of device that may process data, for example, a processor. The term 'processor' refers to a data processing device embedded in hardware and having physical circuitry to carry out codes or instructions of a program. Examples of the data processing device embedded in the hardware may include, but not limited to, a microprocessor, a central processing unit (CPU), a processor core, a multiprocessor, an application-specific integrated circuit (ASIC), a field programmable gate array (FPGA) and other known or later developed processing units.

The controller 110 may be implemented as one physical chip or one or more chips according to function and/or a design choices. However, embodiments are not limited thereto.

Also, although the first memory 120 and the second memory 130 are separate from the controller 110 in FIG. 1 for convenience of explanation, the first memory 120 and the second memory 130 may be included in the controller 110.

An exemplary structure of the first memory 120 and a method of reading data from the second memory 130 according to the type of an input image will now be explained. The following will be explained on the assumption that the input image is a distorted image for convenience of explanation.

<When Input Image is Distorted Image>

FIGS. 2 through 5 are diagrams for explaining the image correction apparatus 100 when the input image is a distorted image according to one or more exemplary embodiments.

Figure 2:
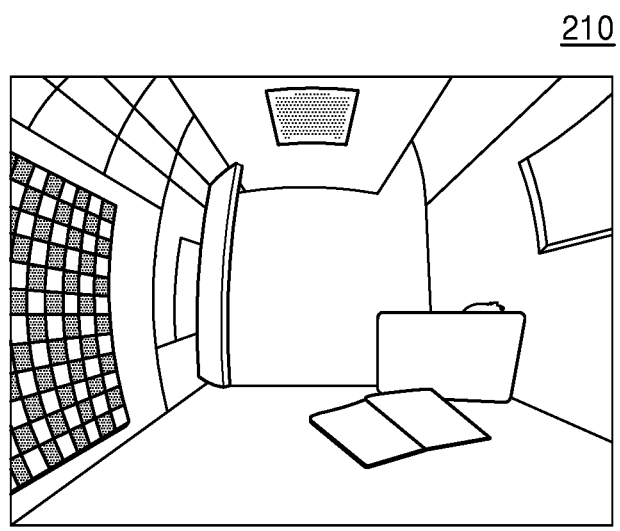
FIG. 2 is a schematic diagram illustrating an input image and an image of a second memory in which the input image is stored.
Figure 2:
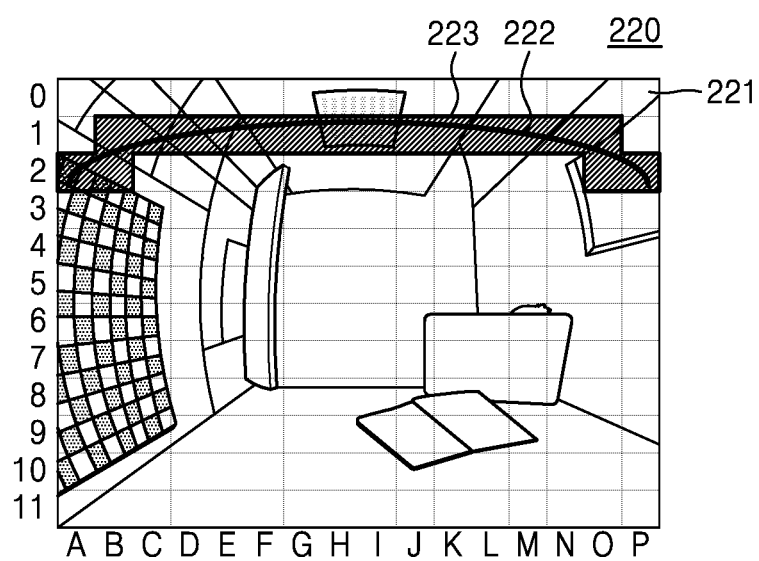

FIG. 2 is a schematic diagram illustrating an input image 210 and an image 220 of the second memory 130 in which the input image 210 is stored.

Referring to FIG. 2, it is assumed that the input image 210 is a distorted image as shown in FIG. 2. Also, it is assumed that the input image 210 is divided into a plurality of image blocks and then stored in the second memory 130. In other words, it is assumed that the input image 210 is stored as the image 220 of FIG. 2 in the second memory 130.

In this case, in order to generate a corrected output image such as an image 510 (see FIG. 5) from the distorted input image 210, all of the image blocks of the input image 210 stored in the second memory 130 may not be needed. For example, a specific image block 221 may not be needed to generate the corrected output image because the specific image block 221 may not correspond to a distorted portion of the input image 210. However, some image blocks such as 223 included in the output image may be needed to generate the corrected output image because the image blocks 223 may correspond to the distorted portion of the input image 210.

As such, only some image blocks of the input image 210 may be used to correct distortion, and in this case, which image blocks are needed, that is, which image blocks are corresponded to the distorted portion(s) of the input image 210 may be determined based on an 'output image generation rule'.

For example, when the input image 210 is a distorted image as shown in FIG. 2, the output image generation rule may be a rule for reading the input image 210 stored in the second memory 130 along at least one imaginary curved line determined based on the distortion ratio of the input image 210. For example, the curved line 222 shown in FIG. 2 may be used for correcting distortion of an upper portion of the image. In other words, a corrected image of an upper portion of the output image may be generated based on the image blocks 223 located along the curved line 222.

The output image generation rule may vary according to the type of the input image 210, and may be pre-determined when the image correction apparatus 100 is manufactured and/or designed. Thus, the output image generation rule may be determined by the controller 110 according to the type of the input image 210. However, the inventive concepts are not directed to the specifics of the output image generation rule, and thus a detailed explanation of the output image generation rule is not necessary to understand the inventive concept and is not provided herein.

When the term 'image block' is used, for example, as in a 'first image block' or a 'second image block', it refers to, when an image is divided into a plurality of parts, any one of the divided parts. In other words, the 'image block' may refer to a data set including information about a plurality of pixels or may refer to a partial image corresponding to the image block. For example, referring to FIG. 2, a plurality of image blocks (e.g., 221, 223) may correspond to a plurality of divided portions of the input image 210. Further, the image blocks may correspond to corrected portions of the output image such as an image 510 (see FIG. 5).

Figure 3:
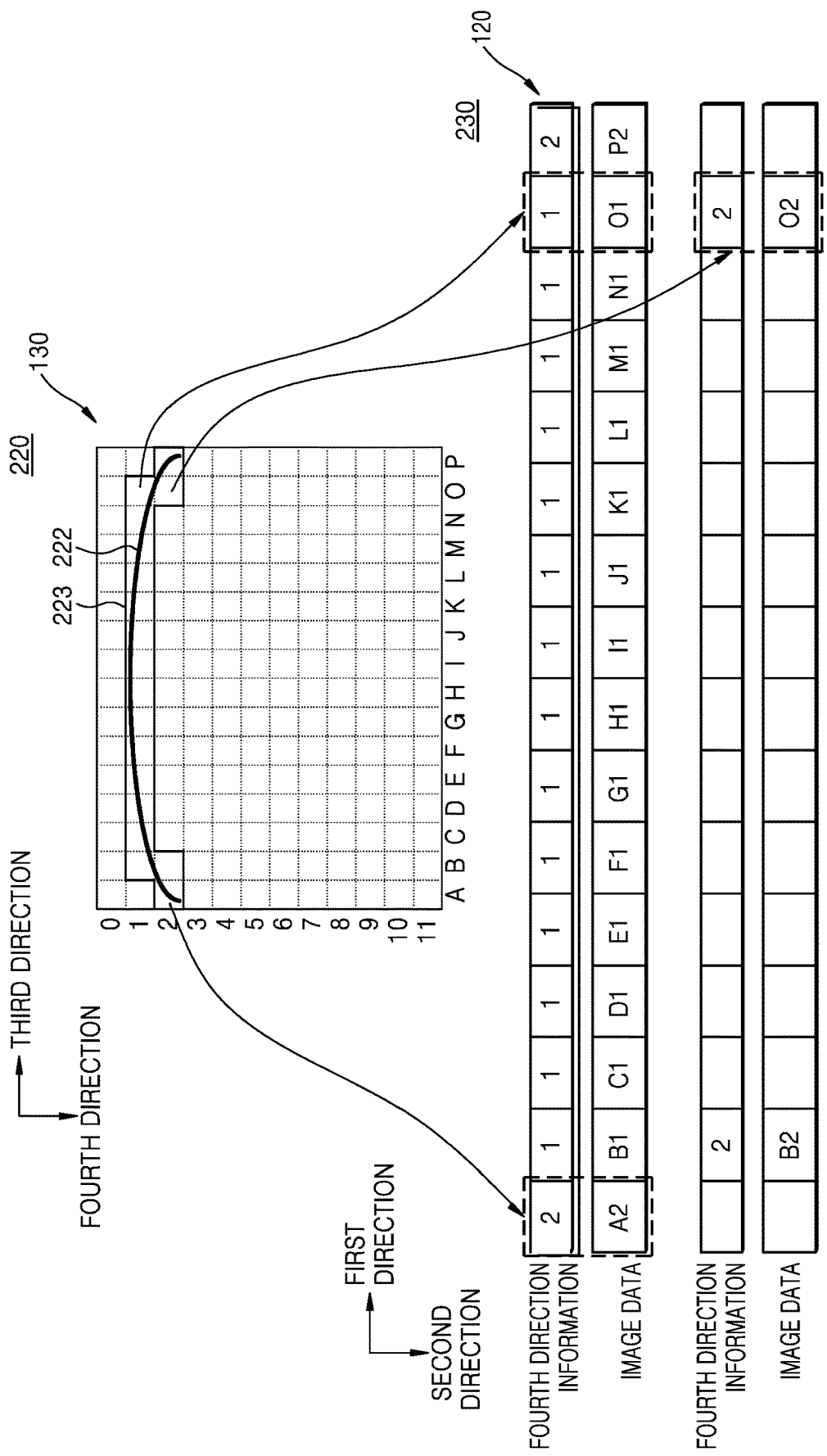
FIG. 3 is a diagram for explaining the structure of a first memory and an output image generation process of the image correction apparatus when an input image is a distorted image.

FIG. 3 is a diagram for explaining the structure of the first memory 120 and an output image generation process of the image correction apparatus 100 when an input image is a distorted image.

For convenience of explanation, it is assumed that the input image 210 is a distorted image as shown in FIG. 2 and the input image 210 is stored in the second memory 130 as the distorted image 220. The input image 210 may be an image taken from a video camera, which generates a series of sequential video images that may be saved as individual images in a frame buffer or the like, as is known in the art, but the input image 210 is not limited thereto. Also, it is assumed that an image of an uppermost portion of an output image is to be generated. For example, it is assumed that the image of the uppermost portion is corrected based on the curved line 222.

Figure 5:
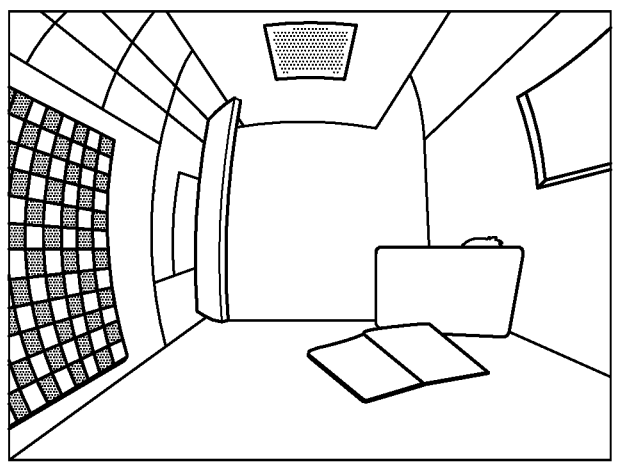
FIG. 5 is a diagram illustrating an input image and an output image generated by the image correction apparatus according to an embodiment of the invention.
Figure 5:
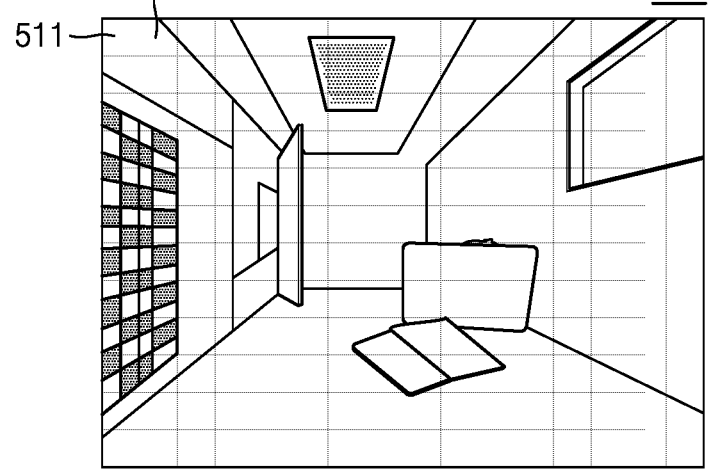

In this case, the controller 110 may determine whether a first image block corresponding to a second image block is stored in the first memory 120 based on a predetermined output image generation rule (e.g., a rule for reading an input image stored in the second memory 130 along the curved line 222 determined based on a distortion ratio of the input image). The first image block(s) may correspond to the distorted image data. Also, when the first image block is not stored in the first memory 120, the controller 110 may read the first image block from the second memory 130 and may store the first image block in the first memory 120. In this case, the second image block may refer to an image block needed in a current step to generate an output image according to the predetermined output image generation rule. Here, the second image block may be stored in the second memory 130. For example, when the second memory 130 previously stored a corrected image data (e.g., a corrected output image related to the previous frame) corresponding to the distorted image, the first image block may be read from the second memory 130. In other words, the second image block may be an image block (511, 512 as shown in FIG. 5) which is portion(s) of the output image whose distortions is corrected. That is, the second image block may be the image block corresponding to the portion of the image which is corrected according to the predetermined output image generation rule. Further, the second image block may further include pre-stored reference image data which is corrected according to the predetermined output image generation rule. Accordingly, even if the input image data is the first input data including a distorted portion of an image, the first image block may be read from the second memory 130.

For instance, since an image of an 'uppermost portion' of an output image is to be generated in FIG. 3, (i.e., since the first image block is read from the second memory 130 and is stored in the first memory 120), the controller 110 may read all of the image blocks 223 located along the curved line 222 from the second memory 130 and may store the image blocks 223 as an image 230 in the first memory 120 as shown in FIG. 3. In this case, the image 230 is a schematic diagram of the first memory 120.

In more detail, the controller 110 may determine a storage location of the first image block, which is read from the second memory 130, in a third direction of the second memory 130. Also, the controller 110 may store the read first image block at a storage location of the first memory 120 corresponding to the determined storage location in the third direction of the second memory 130.

Also, the controller 110 may determine a storage location of the first image block, which is read from the second memory 130, in a fourth direction of the second memory 130, and may store the determined storage location along with the first image block in the first memory 120.

For example, when the controller 110 reads an image block A2 of the second memory 130 as the first image block, the controller 110 may check "A" that is a storage location of the image block A2 in the third direction of the second memory 130, and may store the first image block at a first block of the first memory 120 that is a storage location corresponding to the storage location "A". The controller 110 may check '2' that is a storage location of the image block A2 in the fourth direction of the second memory 130 and may store '2' along with the image block A2 in the first memory 120.

Alternatively, when the controller 110 reads an image block O1 and an image block O2 as the first image block, the controller 110 may store the image blocks O1 and O2 at storage locations of the first memory 120 respectively corresponding to the image blocks O1 and O2. Even in this case, the controller 110 may respectively store '1' and '2' of the image blocks O1 and O2 along with the image blocks O1 and O2 as storage locations in the fourth direction of the second memory 130.

In order to store the first image block according to the above method, the size of the first memory 120 in the first direction may correspond to the size of an input image in a horizontal direction (i.e., the third direction), and the size of the first memory 120 in the second direction may be equal to or greater than at least two block sizes, the block size referring to the size of the first image block stored in the first memory 120 in the second direction.

For example, the size of the first memory 120 in the first direction may be a size corresponding to sixteen first image blocks and the size of the first memory 120 in the second direction may be a size corresponding to two image blocks as shown in FIG. 3.

Referring to FIG. 3, as illustrated in the dotted boxes, the first memory 120 may include a space that may store image data of each of one or more first image blocks and information about storage locations of the one or more first image blocks in the fourth direction of the second memory 130.

Figure 4:
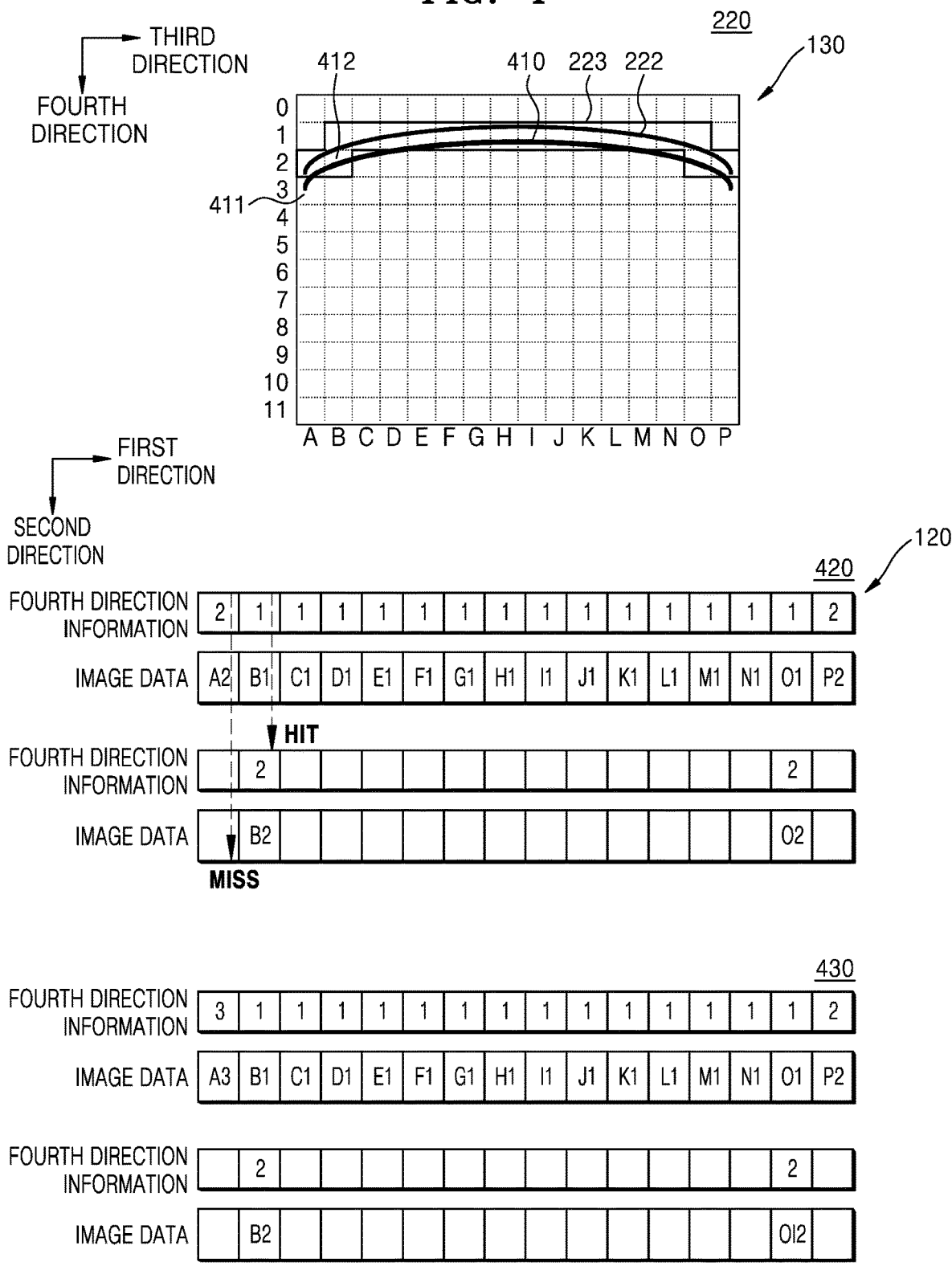
FIG. 4 is a diagram for explaining an output image generation process of the image correction apparatus when an input image is a distorted image.

FIG. 4 is a diagram for explaining an output image generation process of the image correction apparatus 100 when an input image is a distorted image.

For convenience of explanation, it is assumed that the image blocks 223 read by the controller 110 along the curved line 222 are stored in the first memory 120 like in the above method of FIG. 3. Also, it is assumed that the controller 110 generates an output image based on a predetermined output image generation rule (e.g., a rule for reading an input image stored in the second memory 130 along a curved line 410 determined based on a distortion ratio of the input image).

In this case, the controller 110 may determine whether a first image block corresponding to a second image block is stored in the first memory 120 based on the predetermined output image generation rule. In more detail, the controller 110 may determine a storage location of the first image block, corresponding to the second image block, in a third direction of the second memory 130 and a storage location of the first image block in a fourth direction of the second memory 130, based on the predetermined output image generation rule. Also, the controller 110 may determine whether the first image block is stored in the first memory 120 based on the determined storage location in the third direction and the determined storage location in the fourth direction.

For example, when an image block 411 is the first image block, the controller 110 may determine whether the image block 411 is stored in the first memory 120. Since the image block 411 is not stored in the first memory 120 (e.g., since a MISS occurs as block 411 is not one of the blocks along line 410 per the output image generation rule), the controller 110 may read a new image block A3 as shown in an image 430.

However, in contrast, when an image block 412 is the first image block, the controller 110 may determine whether the image block 412 is stored in the first memory 120. Since the image block 412 is stored in the first memory 120 (e.g., since HIT occurs as block 412 is one of the blocks along line 410 per the output image generation rule), the controller 110 may maintain a current storage state as shown in the image 430.

The controller 110 may generate an output image by repeatedly performing the above process based on a plurality of imaginary curved lines determined based on a distortion ratio of an input image. In other words, the controller 110 may determine whether an image block (i.e., first image block) needed to generate an output image is stored in the first memory 120 and, when the image block (i.e., first image block) is not stored in the first memory 120, may read the image block from the second memory 130 and use that image block as the first image block.

As such, the controller 110 may determine whether a first image block corresponding to a second image block is stored in the first memory 120 and, when the first image block is not stored in the first memory 120, may read the first image block from the second memory 130 and store the first image block in the first memory 120.

Therefore, according to the principles of the invention, although the first memory 120 has a small size, an output image may be rapidly generated by preventing an image block from being redundantly read.

FIG. 5 is a diagram illustrating the input image 210 and the output image 510 generated by the image correction apparatus 100 according to an embodiment of the invention.

The controller 110 may generate the output image 510 based on a first image block stored in the first memory 120.

In this case, an image block 511 of the output image 510 may correspond to the image block 'A2' of FIG. 4. Likewise, an image block 512 of the image 510 may correspond to an image block 'B1' of FIG. 4.

<When Input Image is Fisheye Image>

FIGS. 6 through 10 are diagrams for explaining a structure of the first memory 120 when an input image is a fisheye image.

In FIGS. 2 through 5, an embodiment of the first memory 120 and an exemplary operation of the controller 110 according to an output image generation rule are explained for a better understanding of the inventive concepts.

However, since the inventive concepts are not directed to the details of output image generation rule as described above, the following will focus on an embodiment of the first memory 120 according to the type of an input image.

Figure 6:
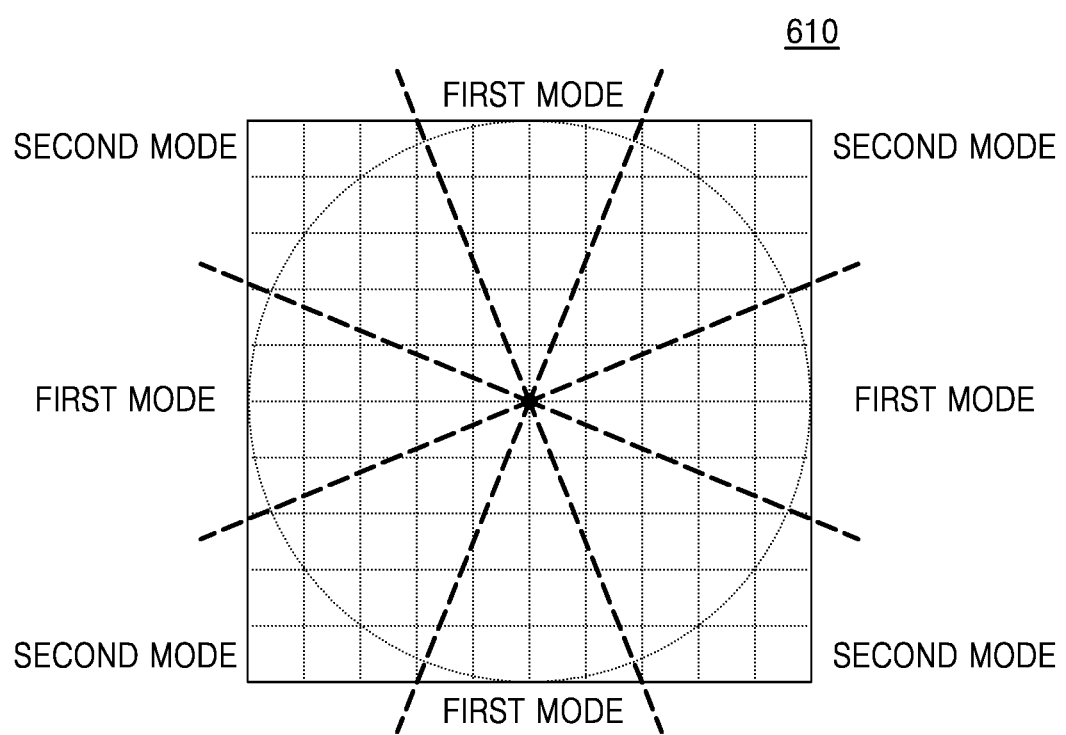
FIG. 6 is a diagram for explaining the case where a dewarping region of a fisheye image corresponds to a first mode.
Figure 7:
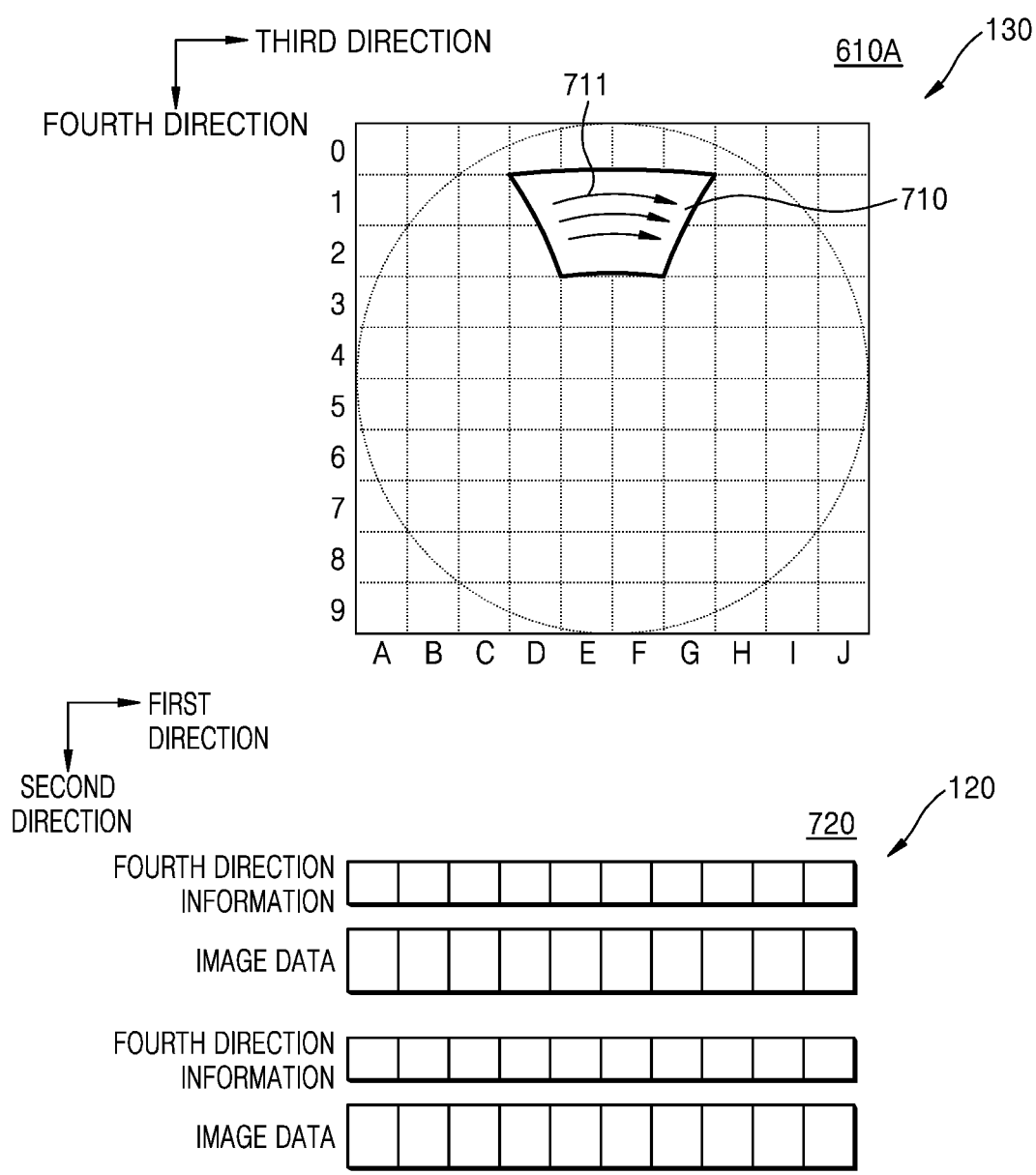
FIG. 7 is a diagram for explaining the structure of the first memory when a dewarping region of a fisheye image corresponds to a first mode.
Figure 8:
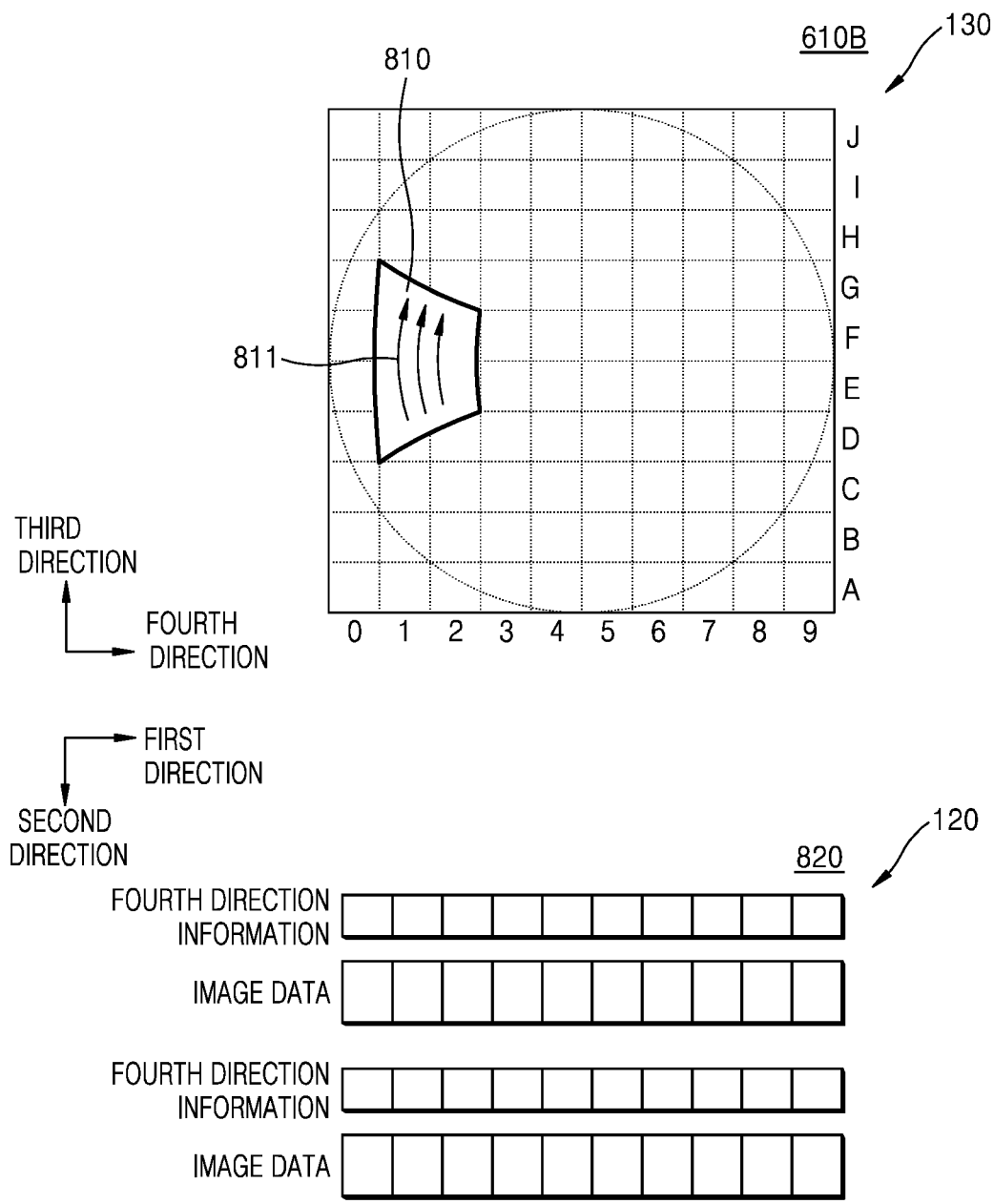
FIG. 8 is a diagram for explaining a structure of the first memory when a dewarping region of a fisheye image corresponds to a first mode.

FIGS. 6 through 8 are diagrams for explaining the case where a dewarping region of a fisheye image corresponds to a first mode.

First, the term 'dewarping region' refers to a region in which a fisheye image is converted into a corrected image. The dewarping region may be set by a user or may be pre-determined when the image correction apparatus 100 is manufactured and/or designed.

The size of the first memory 120 in a first direction according to an embodiment may correspond to at least one of the location and size of the dewarping region in the fisheye image.

FIG. 6 illustrates a mode of selecting a dewarping region according to the location of the dewarping region in a fisheye image. For example, referring to FIG. 6, the dewarping region (a first dewarping region) 710 of FIG. 7 may correspond to a first mode of selecting dewarping regions in alternating 45 degree segments, with 4 "first" segments being designated as the first mode and 4 "second" segments each of which is disposed between adjacent first segments being designated as the second mode. Thus, the dewarping region (a second dewarping region) 810 of FIG. 8 corresponds to the first mode, as does the dewarping region 910 of FIG. 9. That is, the first mode may correspond to the first dewarping region 710, and the second mode may correspond to the second dewarping region 910.

FIG. 7 is a diagram for explaining the structure of the first memory 120 when the dewarping region 710 of a fisheye image corresponds to a first mode.

Referring to FIG. 7, it is assumed that the second memory 130 in which a fisheye image is stored corresponds to an image 610A and in this case, the dewarping region 710 is illustrated.

In this case, an output image generation rule may be a rule for reading an input image stored in the second memory 130 along one or more curved lines 711.

Also, the size of the first memory 120 in a first direction may correspond to the size of the input image in a horizontal direction, as shown in an image 720. In other words, the size of the first memory 120 in the first direction may correspond to the size, in a horizontal direction, that is, a third direction, of the second memory 130 in which the input image is stored. For example, as shown in FIG. 7, it is assumed that the second memory 130 has a size of ten vertical blocks and ten horizontal blocks. In this case, the size of the first memory 120 in the first direction may be the size of ten blocks that is the horizontal size of the second memory 130.

The size of the first memory 120 in a second direction may be equal to or greater than at least two block sizes as described above. In this case, the block size may be the size of a first image block in the second direction.

The controller 110 may generate a general image, that is, a dewarped image, from the fisheye image according to the method of FIGS. 2 through 5 by using the first memory 120.

FIG. 8 is a diagram for explaining a structure of the first memory 120 when the dewarping region 810 of a fisheye image corresponds to a first mode. FIG. 8 is the same as FIG. 7 except that the dewarping region 810 is on the left side from the center of a fisheye image in a fourth direction.

Referring to FIG. 8, it is assumed that the second memory 130 in which the fisheye image is stored corresponds to an image 610B and in this case, the dewarping region 810 is illustrated.

In this case, an output image generation rule may be a rule for reading an input image stored in the second memory 130 along one or more curved lines 811. That is, the output image generation rule may be different from the output image generation rule of FIG. 7.

Also, the size of the first memory 120 in a first direction may correspond to the size of the input image in the vertical direction, as shown in an image 820. In other words, the size of the first memory 120 in the first direction may correspond to the size, in a vertical direction, that is, the third direction, of the second memory 130 in which the input image is stored. For example, as shown in FIG. 8, it is assumed that the second memory 130 has a size corresponding to ten vertical blocks and ten horizontal blocks. In this case, the size of the first memory 120 in the first direction may be the size of ten blocks that is the vertical size of the second memory 130.

The size of the first memory 120 in a second direction may be equal to or greater than at least two block sizes as described above. In this case, the block size may be the size of a first image block in the second direction.

The controller 110 may generate a general image, that is, a dewarped image, from the fisheye image according to the method of FIGS. 2 through 5 by using the first memory 120.

Figure 9:
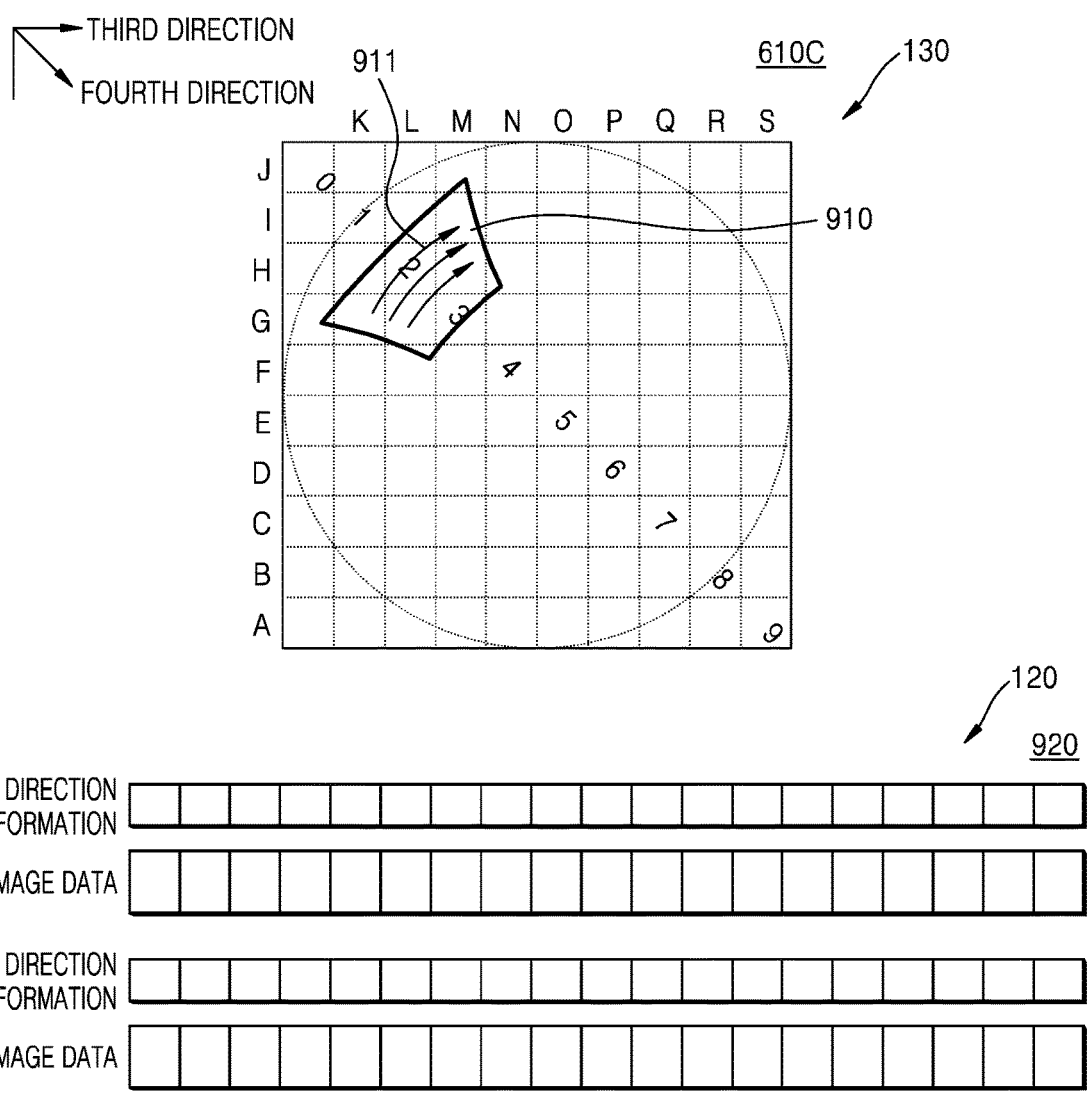
FIG. 9 is a diagram for explaining a structure of the first memory when a dewarping region of a fisheye image corresponds to a second mode.

FIG. 9 is a diagram for explaining a structure of the first memory 120 when the dewarped region 910 of a fisheye image corresponds to a second mode.

Referring to FIG. 9, it is assumed that the second memory 130 in which a fisheye image is stored corresponds to an image 610C and in this case, the dewarping region 910 is illustrated.

In this case, an output image generation rule may be a rule for reading an input image stored in the second memory 130 along one or more curved lines 911. That is, the output image generation rule may be different from the output image generation rules of FIGS. 7 and 8.

Also, the size of the first memory 120 in a first direction may correspond to the sum of the size of the input image in a horizontal direction and the size of the input image in a vertical direction, as shown in an image 920. In other words, the size of the first memory 120 in the first direction may correspond to the size of the second memory 130 in which the input image is stored in a third direction. For example, it is assumed that the second memory 130 has a size corresponding to ten vertical blocks and ten horizontal blocks as shown in FIG. 9. In this case, the size of the first memory 120 in the first direction may be a size of nineteen blocks (excluding one overlapping block) that is the sum of the vertical size of the second memory 130 and the horizontal size of the second memory 130.

The size of the first memory 120 in a second direction may be equal to or greater than at least two block size as described above. In this case, the block size may be the size of a first image block in the second direction.

The controller 110 may generate a general image, that is, a dewarped image, from the fisheye image according to the method of FIGS. 2 through 5 by using the first memory 120.

In this case, when the dewarping region 910 corresponds to a second mode, the fourth direction may be a direction corresponding to a diagonal line of the input image as shown in FIG. 9.

Figure 10:
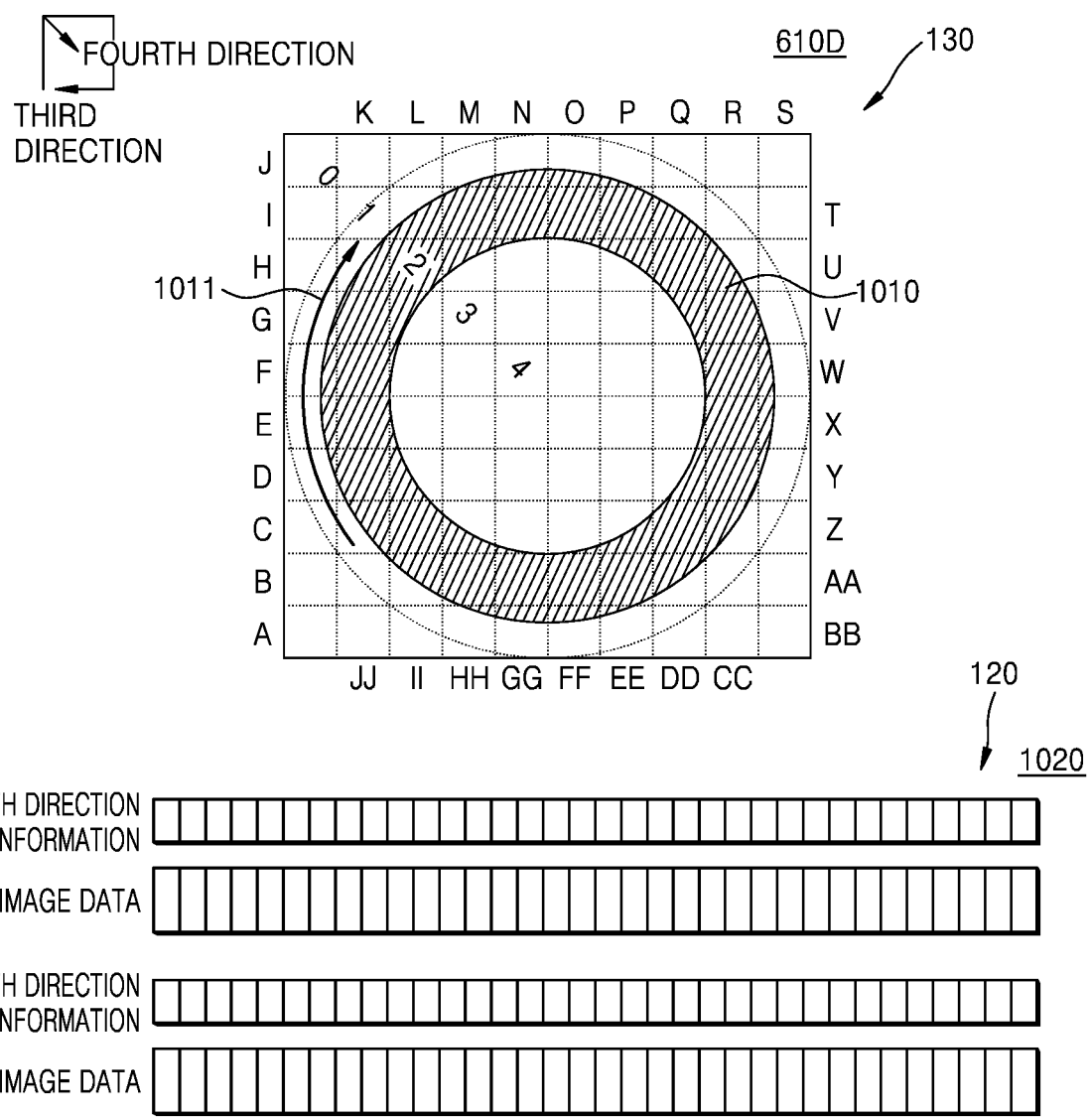
FIG. 10 is a diagram for explaining a structure of the first memory when a dewarping region of a keystone or rotated image corresponds to a third mode.

FIG. 10 is a diagram for explaining a structure of the first memory 120 when the dewarping region 910 of a keystone or rotated image corresponds to a third mode. In this case, the third mode may be, for example, a 360° panorama mode.

Referring to FIG. 10, it is assumed that the second memory 130 in which a fisheye image is stored corresponds to an image 610D and in this case, a dewarping region 1010 is illustrated.

In this case, an output image generation rule may be a rule for reading an input image stored in the second memory 130 along a curved line 1011. In other words, the output image generation rule may be a rule for reading the input image stored in the second memory 130 in a circular fashion.

Also, the size of the first memory 120 in the first direction may correspond to a circumferential length of the input image as shown in an image 1020. In other words, the size of the first memory 120 in the first direction may correspond to a circumferential length of the second memory 130 in which the input image is stored. For example, it is assumed that the second memory 130 has a size corresponding to ten vertical blocks and ten horizontal blocks as shown in FIG. 10. In this case, the size of the first memory 10 in the first direction may be thirty six blocks (excluding overlapping four blocks) that is the circumferential length of the second memory 130.

The size of the first memory 120 in a second direction may be equal to or greater than at least two block sizes as described above. In this case, the block size may be the size of a first image block in the second direction.

The controller 110 may generate a general image, that is, a dewarped image, from the fisheye image according to the method of FIGS. 2 through 5 by using the first memory 120.

When the dewarping region 910 corresponds to a third mode, a fourth direction may be a direction towards the center of the input image as shown in FIG. 10.

<When Input Image is Image to be Keystone-Distorted or Image to be Rotated>

Referring back to FIG. 5, it is assumed that an input image corresponds to the image 510 that is an image to be keystone-distorted or an image to be rotated.

In this case, an output image generation rule may be a rule for reading the input image stored in the second memory 130 according to a predetermined straight line and/or curved line.

Also, the size of the first memory 120 in a first direction may correspond to at least one of a tilt angle of the input image (when the input image is an image to be keystone-distorted) and a rotation angle of the input image (when the input image is an image to be rotated), as shown in the image 1020.

For example, when the input image is an image to be rotated and the rotation angle is 30°, the size of the first memory 120 in the first direction may correspond to a size (i.e., length) of a diagonal line that is rotated over an angle of 30° with the horizontal direction of the input image in the input image.

The size of the first memory 120 in the second direction may be equal to or greater than at least two block sizes as described above. In this case, the block size may be the size of a first image block in the second direction.

The controller 110 may generate a target image (an image to be keystone-distorted or an image to be rotated) according to the method of FIGS. 2 through 5 by using the first memory 120.

Figure 11:
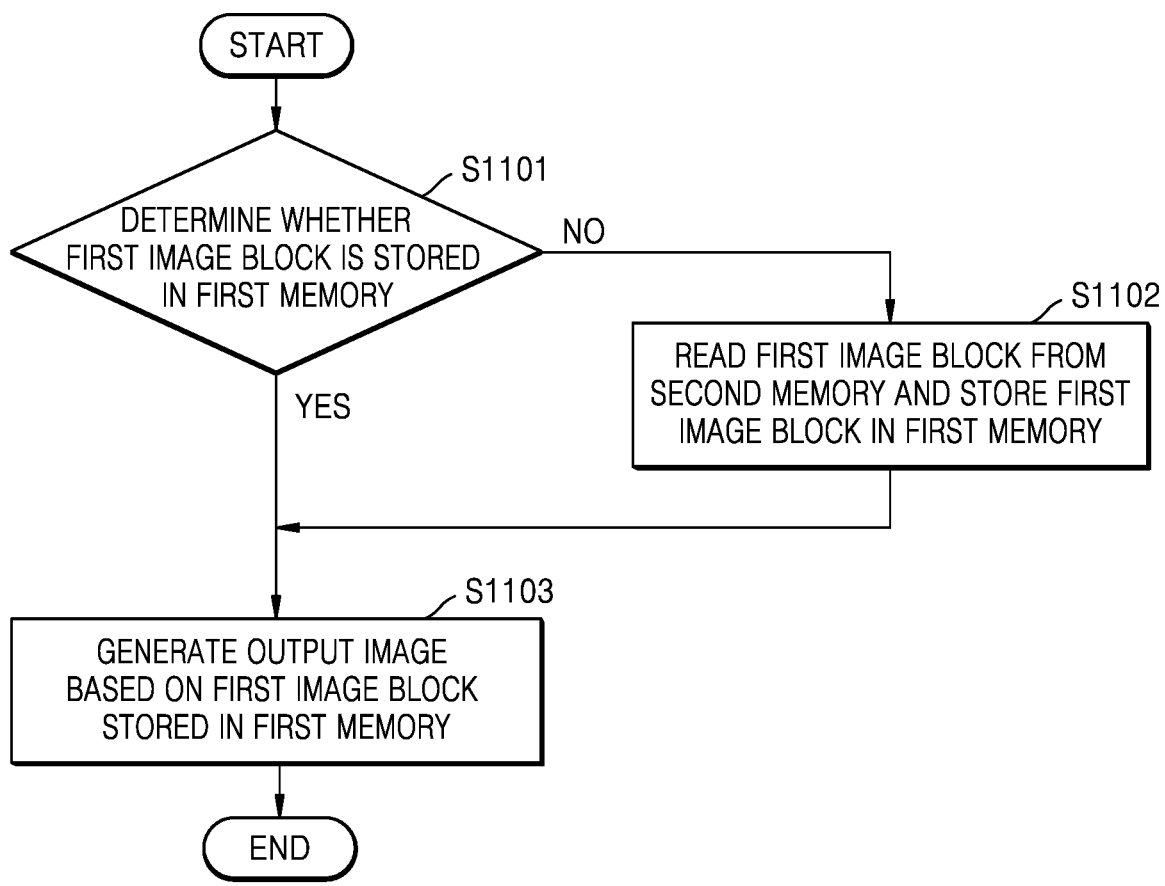
FIG. 11 is a flowchart of an exemplary image correction method performed by the image correction apparatus according to an embodiment.

FIG. 11 is a flowchart of an exemplary image correction method performed by the image correction apparatus 100 according to the principles of the invention. The same description as that already made with reference to FIGS. 1 through 5 will not be repeated.

For example, an input image according to the inventive concepts may be an image from a video camera which generates continuous sequences of video images, but the input image of the inventive concepts is not limited thereto. The controller 100 may access from memory or prepare a reference image (i.e., reference image data) with respect to the type of distorted input images it expects to receive, as is known in the art. For example, when the input image is a fisheye image, the controller 100 may already know how the input image is corrected by using the based on a predetermined output image generation rule.

Then, the controller 100 may identify a distorted portion of the input image. As already illustrated in detail, the input image may be stored in the second memory as the distorted image data. Further, the first image block(s) may correspond to the distorted image data. The second image block may be an image block (511, 512 as shown in FIG. 5) which is portion(s) of the output image whose distortions is corrected. Thus, when the second memory 130 previously stored a corrected image data (e.g., a corrected output image related to the previous frame) corresponding to the distorted image, the first image block may be read from the second memory 130. Also, the second image block may further include pre-stored reference image data which is corrected according to the predetermined output image generation rule. Accordingly, even if the input image data is the first input data including a distorted portion of an image, the first image block may be read from the second memory 130.

Then after, referring to FIG. 11, in operation S1101, the controller 110 may determine whether a first image block corresponding to a second image block is stored in the first memory 120 based on a predetermined output image generation rule. In more detail, the controller 110 may determine a storage location of the first image block in a third direction of the second memory 130 and a storage location of the first image block in a fourth direction of the second memory 130 based on the predetermined output image generation rule. Next, the controller 110 may determine whether the first image block is stored in the first memory 120 based on the determined storage location in the third direction and the determined storage location in the fourth direction.

When it is determined in operation S1101 that the first image block is not stored in the first memory 120, the image correction method proceeds to operation S1102. In operation S1102, the controller 110 read the first image block from the second memory 130 and may store the first image block in the first memory 120. In this case, the second image block may refer to a block needed in a current step to generate an output image according to the predetermined output image generation rule.

In more detail, the controller 110 may determine a storage location of the first image block, which is read from the second memory 130, in the third direction of the second memory 130. Also, the controller 110 may store the read first image block at a storage location of the first memory 120 corresponding to the determined storage location in the third direction of the second memory 130. Also, the controller 110 may determine a storage location of the first image block, which is read from the second memory 130, in the fourth direction of the second memory 130, and may store the determined storage location along with the first image block in the first memory 120.

In operation S1103, the controller 110 may generate an output image based on the first image block that is stored in the first memory 120.

According to the principles of the invention explained herein, an image correction apparatus and method may use a memory having a relatively small size and may have an increased processing speed.

In particular, an image correction apparatus and method according to the one or more exemplary embodiments may rapidly generate an output image by preventing an image block from being redundantly read.

Also, an image correction apparatus and method according to the one or more exemplary embodiments may include a memory structure suitable for a type of each image.

The inventive concepts may be embodied as computer-readable codes in a computer-readable recording medium. The computer-readable recording medium may be any recording apparatus capable of storing data that is read by a computer system. Examples of the computer-readable recording medium include read-only memories (ROMs), random-access memories (RAMs), CD-ROMs, magnetic tapes, floppy disks, and optical data storage devices. Also, the computer-readable recording medium may be distributed among computer systems that are interconnected through a network, and the inventive concepts may be stored and implemented as computer-readable codes in the distributed system. Functional programs, codes, and code segments for embodying the inventive concepts may be easily derived by programmers in the technical field to which the inventive concepts pertains.

While the inventive concepts has been particularly shown and described with reference to embodiments thereof, they are provided for the purposes of illustration and it will be understood by those of ordinary skill in the art that various modifications and equivalent other embodiments can be made from the inventive concepts.

What is claimed is:

1. An image correction method for generating an output image by reading, from a first memory, a first image block corresponding to a second image block that is at least a part of the output image, the first memory having a higher access speed than the second memory, the image correction method comprising the steps of:

temporarily storing at least part of an input image in the second memory, determining whether the first image block corresponding to the second image block is stored in the first memory based on a predetermined output image generation rule which is determined based on a type of the input image stored in the second memory;

when the first image block is not stored in the first memory, reading the first image block from a second memory and storing the first image block in the first memory; and generating the output image based on the first image block stored in the first memory, wherein a size of the first memory in a first direction corresponds to at least one of a tilt angle of the input image, a rotation angle of the input image, and a size of the input image in at least one of a horizontal direction and a vertical direction, wherein a size of the first memory in a second direction different from the first direction is equal to or greater than at least two block sizes, the block size being a size of the first image block in the second direction, wherein the step of reading from a first memory comprises reading image data of each of one or more first image blocks and information about storage locations of the one or more first image blocks in the second memory in a fourth direction, and further comprising the step of storing the first image block in the first memory by:

determining a storage location of the first image block, which is read from the second memory, in a third direction of the second memory; and storing the read first image block at a storage location of the first memory corresponding to the storage location in the third direction of the second memory.

2. The image correction method of claim 1, wherein the input image is a fisheye image, wherein a size of the first memory in a first direction corresponds to at least one of a location and a size of a dewarping region in the fisheye image, and wherein the step of determining whether the first image block corresponding to the second image block is stored in the first memory based on a predetermined output image generation comprises using a predetermined output image generation rule for reading the input image stored in the second memory along a curved line determined based on the dewarping region.

3. The image correction method of claim 2, wherein when the dewarping region corresponds to a first mode, a size of the first memory in the first direction corresponds to a size of the input image in at least one of a horizontal direction and a vertical direction.

4. The image correction method of claim 3, wherein when the dewarping region corresponds to a second mode, a size of the first memory in the first direction corresponds to a sum of a size of the input image in a horizontal direction and a size of the input image in a vertical direction.

5. The image correction method of claim 2, wherein when the dewarping region corresponds to a third mode, a size of the first memory in the first direction corresponds to a circumferential length of the input image.

6. The image correction method of claim 1, wherein the input image is a distorted image, wherein a size of the first memory in a first direction corresponds to a size of the input image in a horizontal direction, and wherein the step of determining whether the first image block corresponding to the second image block is stored in the first memory based on a predetermined output image generation comprises using a predetermined output image generation rule for reading the input image stored in the second memory along a curved line determined based on a distortion ratio of the input image.

7. The image correction method of claim 1, wherein the input image is any one of an image to be keystone-distorted and an image to be rotated, wherein a size of the first memory in a first direction corresponds to at least one of a tilt angle of the input image and a rotation angle of the input image, and wherein the step of determining whether the first image block corresponding to the second image block is stored in the first memory based on a predetermined output image generation comprises using a predetermined output image generation rule for reading the input image stored in the second memory in a direction corresponding to at least one of the tilt angle and the rotation angle of the input image.

8. The image correction method of claim 1, wherein the step of determining whether the first image block is stored comprises:

determining a storage location of the first image block, which corresponds to the second image block, in the third direction of the second memory and a storage location of the first image block in a fourth direction of the second memory, based on the predetermined output image generation rule; and determining whether the first image block is stored in the first memory based on the determined storage location in the third direction and the determined storage location in the fourth direction.

9. An image correction apparatus comprising:

a second memory configured to temporarily store at least a part of an input image;

a first memory having a higher access speed than the second memory, the second memory being configured to selectively read a first image block from the second memory and store the selectively read first image block in the first memory; and a controller configured to control the first image block to be selectively read from the second memory and to be stored in the first memory based on a predetermined output image generation rule which is determined based on a type of an input image stored in the second memory, wherein the controller is further configured to determine whether the first image block corresponding to a second image block is stored in the first memory based on the predetermined output image generation rule, and when the first image block is not stored in the first memory, to read the first image block from the second memory and store the first image block in the first memory, and generate an output image based on the first image block stored in the first memory, wherein a size of the first memory in a first direction corresponds to at least one of a tilt angle of the input image, a rotation angle of the input image, and a size of the input image in at least one of a horizontal direction and a vertical direction, wherein a size of the first memory in a second direction different from the first direction is equal to or greater than at least two block sizes, the block size being a size of the first image block in the second direction, wherein the first memory comprises image data of each of one or more first image blocks and information about storage locations of the one or more first image blocks in a fourth direction of the second memory, and wherein the controller is further configured to: determine a storage location of the first image block, which is read from the second memory, in a third direction of the second memory, and store the read first image block at a storage location of the first memory corresponding to the storage location in the third direction of the second memory.

10. The image correction apparatus of claim 9, wherein the input image is a fisheye image, wherein a size of the first memory in a first direction corresponds to at least one of a location and a size of a dewarping region in the fisheye image, and wherein the predetermined output image generation rule comprises a rule for reading the input image stored in the second memory along a curved line determined based on the dewarping region.

11. The image correction apparatus of claim 10, wherein the size of the first memory in the first direction corresponds to a size of the input image in at least one direction from among a horizontal direction and a vertical direction.

12. The image correction apparatus of claim 10, wherein when the size of the first memory in the first direction corresponds to a sum of a size of the input image in a horizontal direction and a size of the input image in a vertical direction.

13. The image correction apparatus of claim 10, wherein when the size of the first memory in the first direction corresponds to a circumferential length of the input image.

14. The image correction apparatus of claim 9, wherein the input image is a distorted image, wherein the size of the first memory in a first direction corresponds to a size of the input image in a horizontal direction, and wherein the predetermined output image generation rule comprises a rule for reading the input image stored in the second memory along a curved line determined based on a distortion ratio of the input image.

15. The image correction apparatus of claim 9, wherein the input image is any one of an image to be keystone-distorted and an image to be rotated, wherein the size of the first memory in a first direction corresponds to at least one of a tilt angle of the input image and a rotation angle of the input image, and wherein the predetermined output image generation rule comprises a rule for reading the input image stored in the second memory in a direction corresponding to at least one of the tilt angle and the rotation angle of the input image.

16. The image correction apparatus of claim 1, wherein the controller is further configured to:

determine a storage location of the first image block, which corresponds to the second image block, in the third direction of the second memory and a storage location of the first image block in a fourth direction of the second memory, based on the predetermined output image generation rule, and determine whether the first image block is stored in the first memory based on the determined storage location in the third direction and the determined storage location in the fourth direction.

* * * * *